B. H. BURGESS.
BEARING FOR LINTER SHAFTS.
APPLICATION FILED FEB. 20, 1915.
1,184,514.
Patented May 23, 1916.
2 SHEETS—SHEET 1.
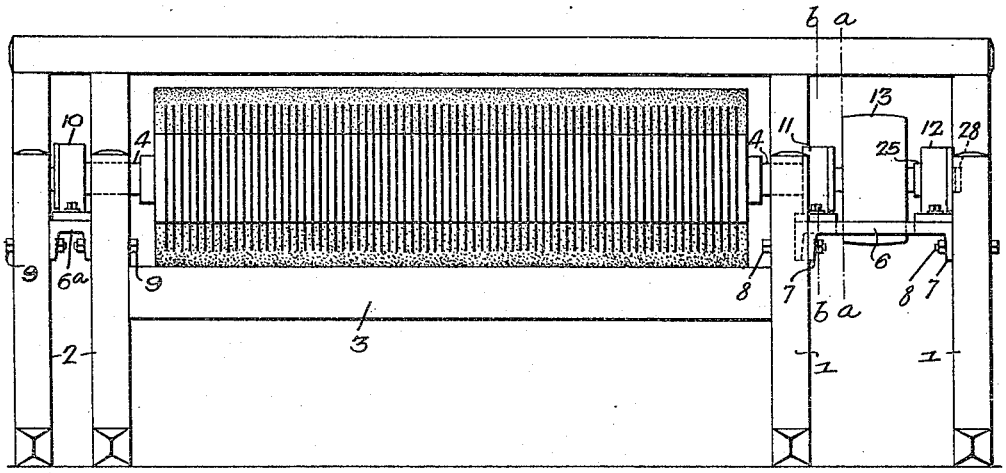
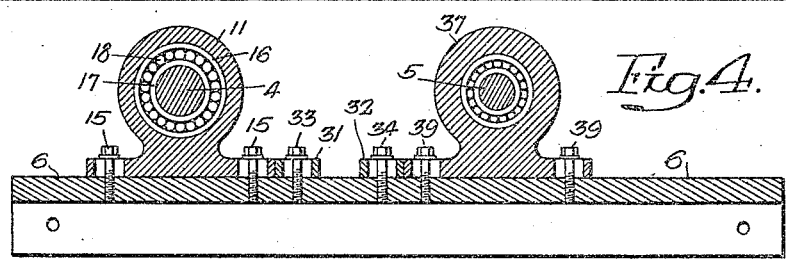
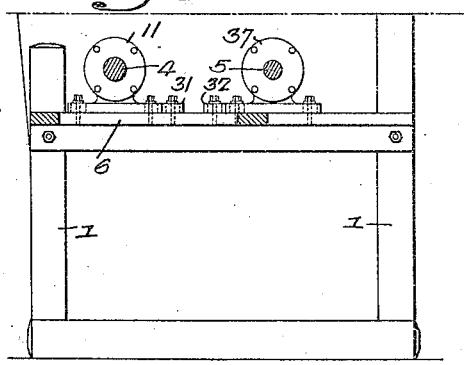
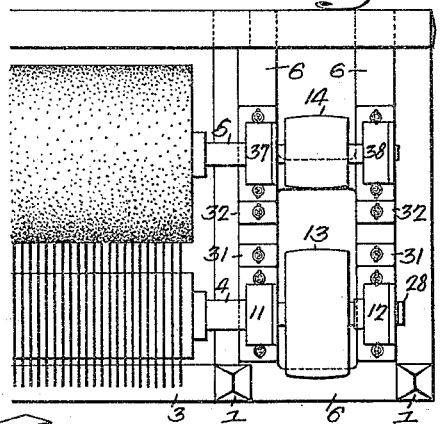
Witnesses—
Inventor—
Benjiman H. Burgess.
by his Attorneys—

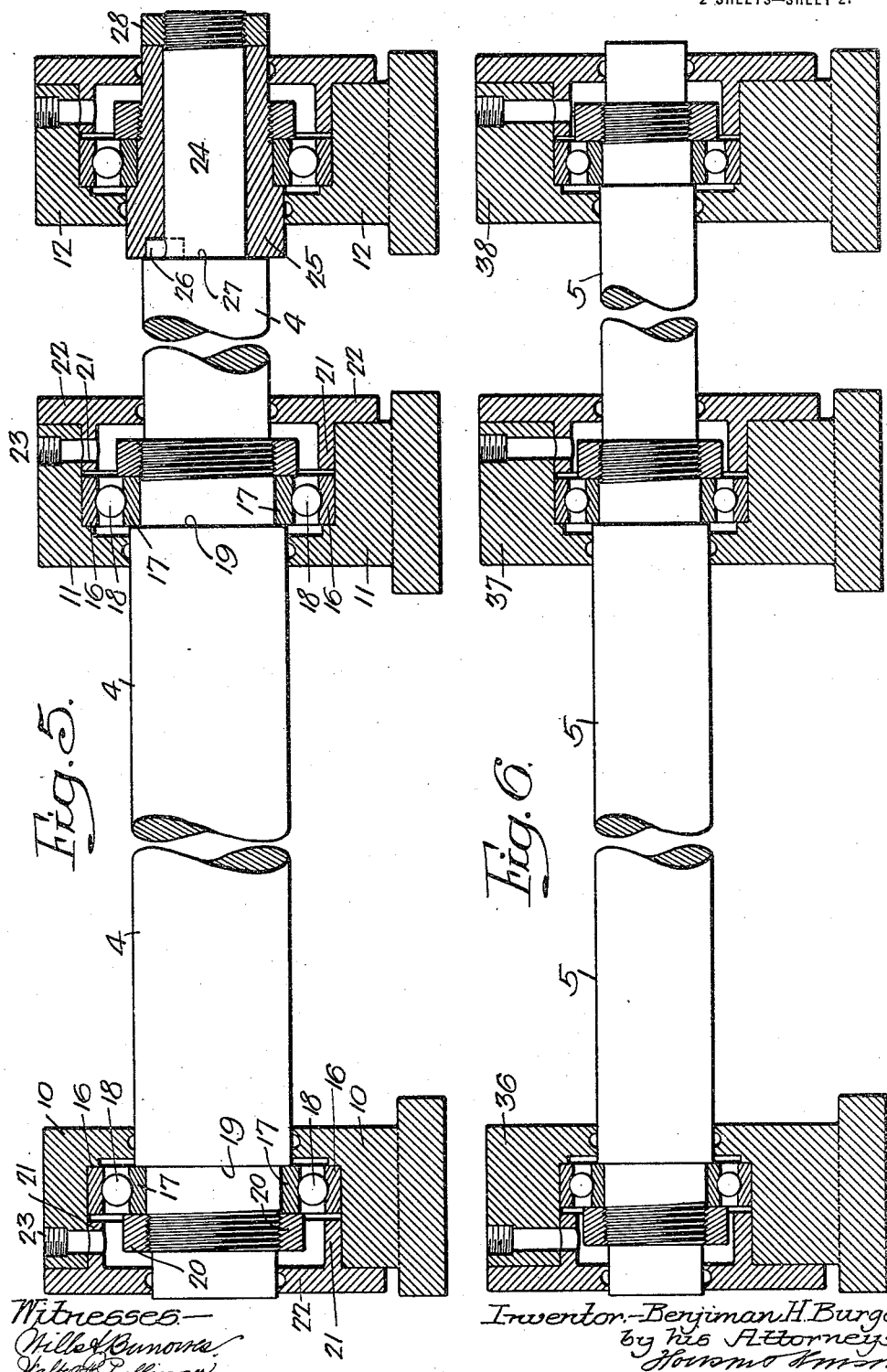

UNITED STATES PATENT OFFICE.

BENJIMAN H. BURGESS, OF ATLANTA, GEORGIA.

BEARING FOR LINTER-SHAFTS.

1,184,514.      Specification of Letters Patent.      Patented May 23, 1916.

Application filed February 20, 1915. Serial No. 9,526.

*To all whom it may concern:*

Be it known that I, BENJIMAN H. BURGESS, a citizen of the United States, and a resident of Atlanta, county of Fulton, State of Georgia, have invented certain Improvements in Bearings for Linter-Shafts, of which the following is a specification.

My invention relates to certain improvements in linting machines for removing the lint from cotton seeds.

One object of the invention is to provide means for mounting the brush and the saw cylinder in bearings of such a type that the friction will be considerably reduced.

A further object of the invention is to provide means for properly supporting the bearings and to keep them in perfect alinement, which support will also stiffen the frame of the machine and will allow the brush and saws to run at a greater speed, due to this added rigidity of the frame.

A still further object of the invention is to provide means for retaining the bearings of the brush and saw cylinder in fixed relation to each other while in operation, but with means provided which will allow the bearings of the saw and brush shaft to be adjusted to and from each other when necessary.

Another object of the invention is to construct a saw cylinder shaft and bearings in such a manner that two of the bearings can be retained on the shaft when the cylinder is removed for sharpening the saws.

Still another object of the invention is to construct a saw cylinder shaft and one end bearing in such a manner that the end bearing can be removed intact, without dismantling, when necessary to remove the pulley.

In the accompanying drawings: Figure 1 is a front view of sufficient of a linting machine to illustrate my invention; Fig. 2 is a sectional plan view, showing the bearings for the saw cylinder and brush; Fig. 3 is a sectional view on the line *a—a*, Fig. 1; Fig. 4 is a sectional view on the line *b—b*, Fig. 1; Fig. 5 is a detached sectional view of the bearings for the saw cylinder shaft; Fig. 6 is an enlarged sectional view of the bearings for the brush shaft; and Fig. 7 is a perspective view of one of the plates.

Referring to the drawings, 1, 1 and 2, 2 are the frames which are located at the ends of the machine. The inner frames 1 and 2 are connected together by longitudinal beams 3, and I have only shown the rotating linter brush, the saw cylinder. and their bearings, as the invention relates particularly to these elements.

4 is the shaft of the saw cylinder and 5 is the shaft of the brush. These two elements are arranged in the usual manner in the standard type of linters. Heretofore, it has been the usual practice to mount the bearings for these two shafts on the end frames 1, 1 and 2, 2 and as these two shafts are driven by one belt running around the pulleys on each shaft there is a tendency to pull the two shafts toward each other and out of alinement. The friction is consequently very great and one feature of the invention is to reduce the friction and to provide a rigid support for the bearings.

Extending from one end frame 1 to the other end frame 1 is a plate 6, preferably the full depth of the machine, and this plate has a downward integral flange 7 at each side rigidly secured to the end frames by bolts 8. There may be as many of these bolts as desired so as to rigidly secure these plates to the frames. At the opposite end of the machine is a narrower plate 6$^a$ located between the two frames 2, 2 and secured to the frame by bolts 9. Mounted on this latter plate 6$^a$ is a single ball bearing 10, and mounted on the plate 6 are two ball bearings 11 and 12 spaced a sufficient distance apart to allow for the belt pulleys 13 and 14, which are mounted on the shafts 4 and 5 respectively. A belt passes around these two pulleys in such a manner that both shafts are driven by the one belt, the belt passing on from the machine around a pulley on line or counter-shaft, as the case may be.

The ball bearings are made as clearly shown in Figs. 4 and 5, and I will first describe the bearings of the saw cylinder. 4 is the shaft and 10, 11 and 12 are the bearings for the said shaft. The bearings 10 and 11 are identical and each consists of a body portion, which is secured to the plate 6 by bolts 15. In the body portion is an outer raceway 16 and on the reduced portion of the shaft is an inner raceway 17 and located between the raceways are the balls 18. The inner raceway 17 is held against a shoulder 19 on the shaft by a screw threaded ring 20 adapted to the threads on the reduced portion of the shaft, as shown, while the outer raceway is located between a shoulder on the body portion and a flange 21 of a cap plate 22. There is a certain amount of clearance between the cap plate and the raceway 16 so as to allow the raceway to accommodate itself to the balls. 23 is an opening through which the bearing is lubricated. The pulley end of the shaft is reduced, as at 24, and mounted on the end of this shaft is a sleeve 25 having an internal diameter equivalent to that portion of the shaft in the bearing 11, so that the same sized inner and outer raceways and balls may be used in the bearing 12 as in the bearing 11. The sleeve 25 is held from turning on the reduced portion 24 of the shaft by a pin 26 and is held against the shoulder 27 on the shaft by a screw ring, or nut, 28. The pulley 13 is secured to the shaft between the two bearings 11 and 12.

It is necessary to frequently remove the saw cylinder from the machine for the purpose of sharpening the teeth. Usually, this must be done about every 24 or 30 hours, consequently, it is essential to provide means for readily removing the shaft and the saw cylinder carried thereby. When it is desired to remove the cylinder, I remove the six screws, or bolts, holding the bearings 10, 11 and 12 to the plates 6 and 6ª. The cylinder shaft 4 is then removed from the linter with the bearings intact. The nut 28 on the end of shaft 4 is then removed and the bearing 12 is slipped off the end of the shaft to allow removal of the pulley. The saw cylinder shaft 4 is then set on the filing machine with the bearings 10 and 11 attached thereto. After the cylinder is sharpened, the pulley is replaced on the shaft and the bearing 12 is again slipped on the end of the shaft and is fastened against the shoulder with nuts 28. The saw cylinder is then ready to be placed in the linter again with the ball bearings in their previous positions.

In order to insure the proper location of the several bearings of the saw cylinder after sharpening, I provide stop plates 31 for the bearings 10, 11 and 12, and stop plates 32 for the bearings of the brush shaft. These plates are slotted, as shown, and bolts 33 and 34, respectively, pass through the slots in the plates and into threaded openings in the plates 6 and 6ª. Thus, the stop plates are held rigidly to the base plates so that when the bearings are removed and replaced they will be in the same position when reassembled as they were previously. If it be necessary to move the shafts toward each other, due to the wearing away of the teeth of the saw cylinder or the brushes, then these stop plates, because of the slots therein, can be adjusted and firmly fastened in position after adjustment. The flanges of the body portions of the bearings are also slotted for the bolts 15 so that they can be adjusted in contact with the stop plates as the two abutting surfaces are finished to insure an accurate bearing of one part against the other.

The shaft 5 of the brush is separate from the brush and the brush is held thereto by set screws, or other fastenings, so that, when it is desired to back off the screws, the brush can be withdrawn from the shaft. This shaft is mounted in bearings 36, 37, and 38, all identical in design and made similar to the bearings 10 and 11 of the saw cylinder shaft 4. The raceways of the bearings 36 and 37 are the same, whereas the raceways of the bearings 38 are less in diameter, due to the reduction in the shaft at this bearing. The pulley 14 is mounted on the shaft between the two bearings 37 and 38 but as this shaft does not have to be removed so frequently as the saw shaft, it is not necessary to provide a construction which will allow for the ready removal of the shaft.

The stop plates 32 are slotted similarly to the plates 31 and the flanges of the body portion of the bearings are also slotted for the passage of the bolts 39, which are screwed into threaded openings in the plates 6 and 6ª. These plates 6 and 6ª not only form substantial supports for the bearings and a rigid connection between the bearings, but they also act to rigidly tie the frames 1, 1 and 2, 2 together. These frames are generally made of wood, and by locating the plates, as hereinbefore described, the rigidity of the machine is materially increased.

I claim:

1. The combination of a main frame; a ball bearing at one end of the frame; two ball bearings at the other end of the frame arranged comparatively close together; a shaft mounted in the said bearings; a pulley on the shaft between the two bearings at one end of the frame, the end of the shaft beyond the pulley being reduced in diameter; a sleeve of greater diameter than the shaft mounted on the reduced portion thereof and extending into the ball bearing, said sleeve carrying the inner race of the ball bearing; and means for detachably securing the sleeve to the shaft, the parts being so arranged that when it is desired to remove the shaft from the bearings it can be withdrawn from the sleeve, leaving the ball bearing and its sleeve intact.

2. The combination of a main frame consisting of two end frames at each end of a machine spaced apart; base plates bridging the gap between the two frames at each end of the machine and rigidly secured to the said end frames; two sets of bearings rigidly secured to one of said plates; a single set of bearings secured to the other plate; and two parallel shafts mounted in said bearings.

3. The combination of a base plate rigidly secured to the frame of a machine; two bearings mounted on the plate, one back of the other; a shaft mounted in each bearing; means for securing the bearings to the plate; and detachable stop plates mounted on the base plate and acting as positive stops to hold the bearings the proper distance apart.

4. The combination of a main frame; a base plate rigidly secured to the frame; bearings mounted on the base plate; a shaft mounted in each bearing, the bearings having slotted openings; bolts extending through the openings into the base plate; slotted stop plates; and bolts extending into threaded openings in the base plate whereby the said stop plates and bearings can be adjusted and, after adjustment, can be rigidly secured in position so as to hold the shafts in alinement.

5. The combination of a main frame; a ball bearing at one end of the frame and two ball bearings on the other end of said frame, said bearings being spaced apart; a shaft mounted in the ball bearings; a pulley on the shaft between the two latter bearings, the pulley end of the shaft being reduced in diameter and threaded at its outer end; a sleeve mounted on the shaft; a nut retaining the sleeve in position; and a pin on the shaft adapted to a notch in the sleeve, insuring the sleeve turning with the shaft, the parts being so arranged that when it is desired to detach the shaft, the nut can be removed and the shaft withdrawn from the sleeve, leaving the ball bearing intact.

In testimony whereof, I have signed my name to this specification, in the presence of two subscribing witnesses.

BENJIMAN H. BURGESS.

Witnesses:
O. L. WILLIAMS,
JOHN T. STARKE.

Copies of this patent may be obtained for five cents each, by addressing the "Commissioner of Patents, Washington, D. C."